United States Patent [19]

Kurakake et al.

[11] Patent Number: 4,661,904

[45] Date of Patent: Apr. 28, 1987

[54] COMPUTER FOR FORMING A TABLE BY SELECTING A PROGRAM LANGUAGE MODE DURING A TABLE MODE

[75] Inventors: Sigeo Kurakake, Hanno; Satoshi Ogasawara, Tokyo, both of Japan

[73] Assignee: Casio Computer Co., Ltd., Tokyo, Japan

[21] Appl. No.: 595,040

[22] Filed: Mar. 30, 1984

[30] Foreign Application Priority Data

Apr. 12, 1983 [JP] Japan .................................. 58-64031

[51] Int. Cl.[4] .................................................. G06F 9/06

[52] U.S. Cl. ...................................................... 364/200

[58] Field of Search ... 364/200 MS File, 900 MS File, 364/300

[56] References Cited

U.S. PATENT DOCUMENTS 4,455,619 6/1984 Masui et al. .................... 364/300 X

OTHER PUBLICATIONS

U.S. Book, "Computer Systems Organization and Programming", H. Katzan, Science Research Associates Inc., 1976, pp. 394-405.

*Primary Examiner*—Thomas M. Heckler

*Attorney, Agent, or Firm*—Frishauf, Holtz, Goodman & Woodward

[57] ABSTRACT

A computer is arranged to operate in either a table mode, or a program language mode that can be selected during the table mode by appropriate switching to form a table. In the program language mode, a program is written in suitable language and is run. In the table mode, a table is formed by entering table format data and table item data, without program writing. When the table mode is selected, a table managing section requests a program language-managing section to supply item data obtained by running the program, and the supplied item data is used to complete the table.

6 Claims, 24 Drawing Figures

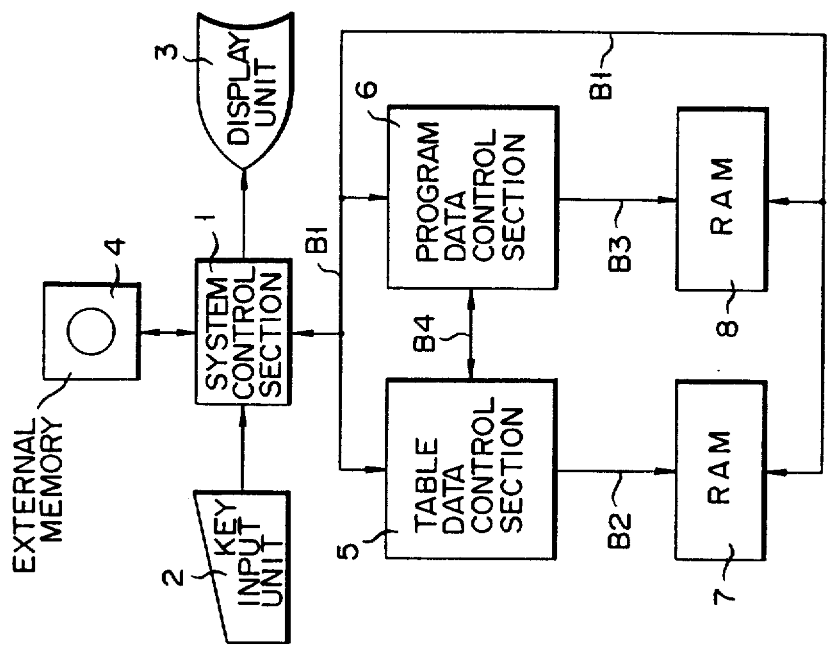
F I G. 2
EXTERNAL MEMORY
4
SYSTEM CONTROL SECTION
1
3
DISPLAY UNIT
2
KEY INPUT UNIT
B1
6
PROGRAM DATA CONTROL SECTION
B4
5
TABLE DATA CONTROL SECTION
B3
B2
RAM
RAM
8
7
B1
IT1
IT2
IT3
IT4
RC 1
RC 2
RC 3
RC 4
b
c
a
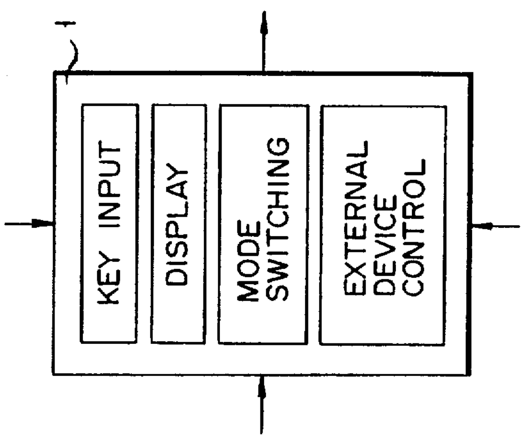
F I G. 3
1
KEY INPUT
DISPLAY
MODE SWITCHING
EXTERNAL DEVICE CONTROL START
INSTRUCTION DATA
PROGRAM DATA REQUEST (F/F SET)
F/F RESET
REGISTER DESIGNATION
R/W
ADDRESS
MANAGEMENT ADDRESS
ADDRESS CONVERSION INSTRUCTION
GATE OPEN (SEND)
GATE OPEN (RECEIVE)
TIMING
REFERENCE CLOCK
14
51
52
FETCH
INS. REG
53
INSTRUCTION DECODER
TIMING CONTROL CIRCUIT
54

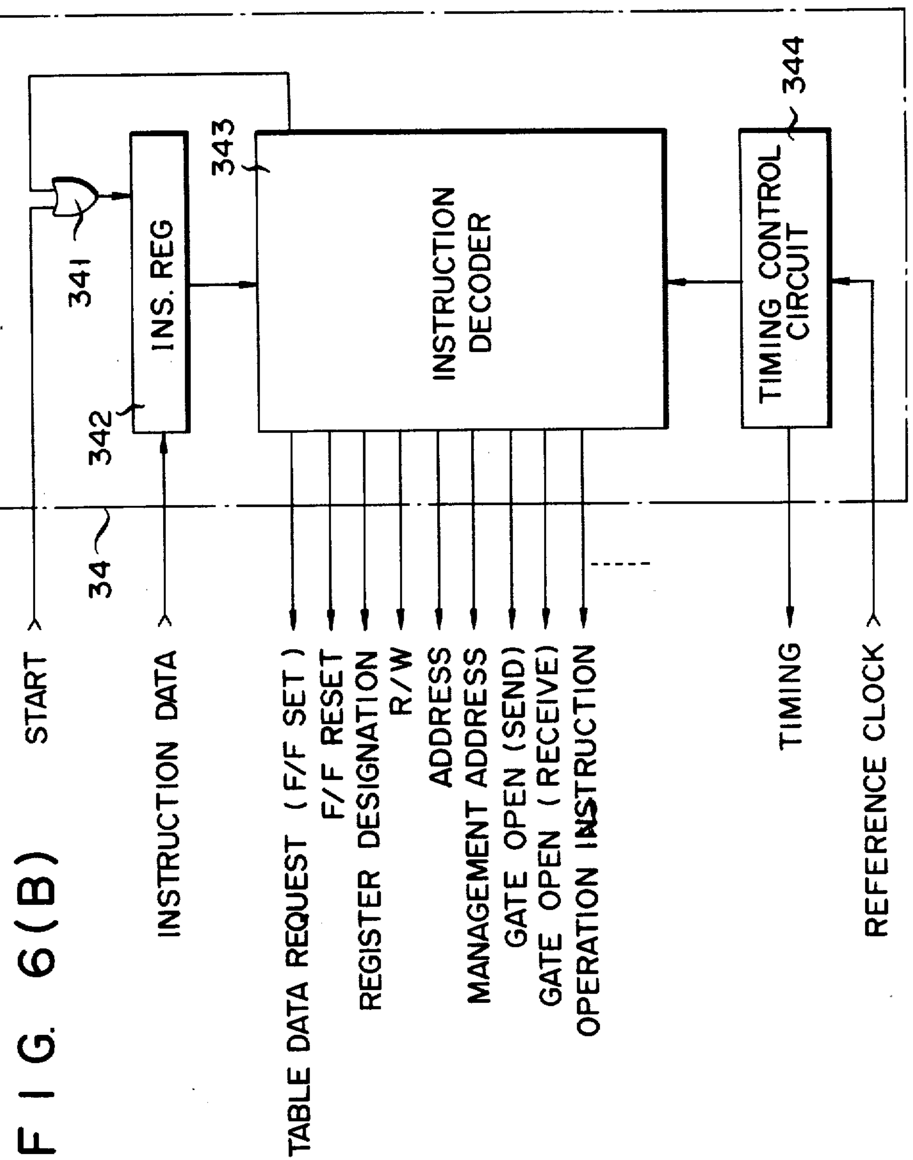
F I G. 6(B)

F I G. 9
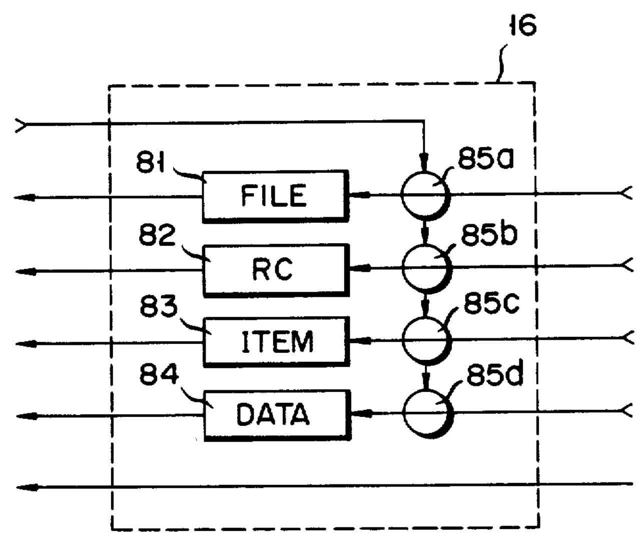
F I G. 10
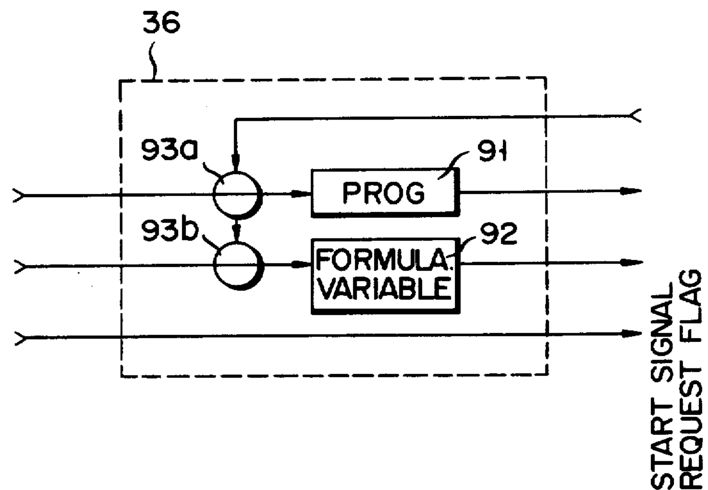

F I G. 11
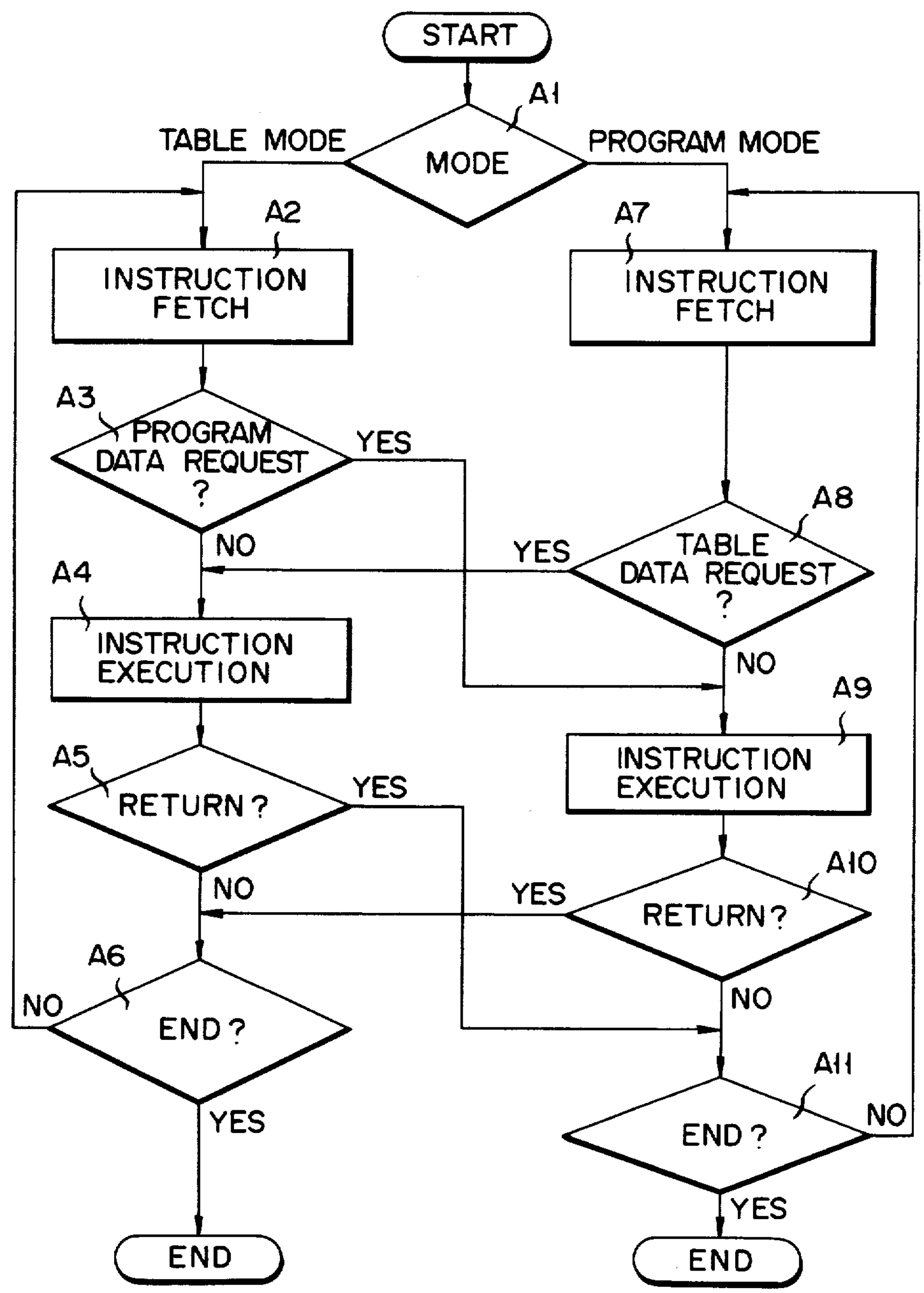

FIG. 12(A)

FILE 1 (TV)

| | IT1 | IT2 | IT3 | IT4 |
|---|---|---|---|---|
| RC 0 | NAME | JAN. | FEB. | TOTAL |
| RC 1 | TOM | 100 | 200 | ? |
| RC 2 | BILL | 50 | 60 | ? |
| RC 3 | TOTAL | SUM RC(1,2) | SUM RC(1,2) | |

FIG. 12(B)

FILE 2 (RADIO)

| | IT1 | IT2 | IT3 | IT4 |
|---|---|---|---|---|
| RC 0 | NAME | JAN. | FEB. | TOTAL |
| RC 1 | TOM | 500 | 600 | PROG1; A |
| RC 2 | BILL | 120 | 110 | PROG1; A |
| RC 3 | TOTAL | PROG1; B | PROG1; B | SUM RC (1,2) |

FIG. 12(C)

FILE 3 (TOTAL)

| | IT1 | IT2 | IT3 | IT4 |
|---|---|---|---|---|
| RC 0 | NAME | JAN. | FEB. | TOTAL |
| RC 1 | TOM | PROG 2 ; C | | |
| RC 2 | BILL | PROG 2 ; D | | |
| RC 3 | TOTAL | SUM RC(1,2) | SUM RC(1,2) | |

FIG. 12(D)

FILE 1 (TV)

| | IT1 | IT2 | IT3 | IT4 |
|---|---|---|---|---|
| RC 0 | NAME | JAN. | FEB. | TOTAL |
| RC 1 | TOM | 100 | 200 | 300 |
| RC 2 | BILL | 50 | 60 | 110 |
| RC 3 | TOTAL | 150 | 260 | 410 |

FIG. 12(E)

FILE 2 (RADIO)

| | IT1 | IT2 | IT3 | IT4 |
|---|---|---|---|---|
| RC 0 | NAME | JAN. | FEB. | TOTAL |
| RC 1 | TOM | 500 | 600 | 1,100 |
| RC 2 | BILL | 120 | 110 | 230 |
| RC 3 | TOTAL | 620 | 710 | 1,330 |

FIG. 12(F)

FILE 3 (TOTAL)

| | IT1 | IT2 | IT3 | IT4 |
|---|---|---|---|---|
| RC 0 | NAME | JAN. | FEB. | TOTAL |
| RC 1 | TOM | 600 | 800 | 1,400 |
| RC 2 | BILL | 170 | 170 | 340 |
| RC 3 | TOTAL | 770 | 970 | 740 |

FIG. 13(A)

FILE 0

| | IT1 | IT2 | IT3 | IT4 |
|---|---|---|---|---|
| RC0 | ARTICLE | UNIT PRICE | QUANTITY | AMOUNT |
| RC1 | AMP. | 11.5 | 100 | 1,150 |
| RC2 | TUNER | 4.8 | 50 | 240 |
| RC3 | SPEAKER | 12.0 | 430 | 5,160 |
| RC4 | PLAYER | 9.5 | 80 | 760 |

FIG. 13(B)

FILE 1

| | IT1 | IT2 | IT3 |
|---|---|---|---|
| RC0 | RC | SIN (RC*45) | PROG 0; A |
| RC1 | 1 | 0.70711 | 0.70711 |
| RC2 | 2 | 1.00000 | 0.00000 |
| RC3 | 3 | 0.70711 | -0.70711 |

PROG 0

```
10 A=COS(RC*45)
20 END
```

FILE 2

| | IT1 | IT2 | IT3 | IT4 |
| --- | --- | --- | --- | --- |
| RC 0 | | | | |
| RC 1 | | | 0.01234 | |
| RC 2 | | | | |
| RC 3 | | | | |
| RC 4 | | | | |

PROG 1

```
10 B=FL(FILE1,RC,IT2)
20 C=SIN(B)*COS(B)
30 FL(FILE2,RC1,IT3)=C
40 END
```

FIG. 13(C)

FILE 3

| | IT1 |
| --- | --- |
| RC0 | STEP |
| RC 1 | A = 0 |
| RC 2 | B = SIN (A) |
| RC 3 | C = 90 |
| RC 4 | D = COS(A) |
| RC 5 | E = B + D |

FIG. 13(D)

A3
PROGRAM DATA REQUEST ?
YES
F/F SET
C1
SET PROG IN PROG REGISTER
C2
SET FORMULA AND VARIABLE DATA IN FORMULA/VARIABLE REGISTER
C3
GATE OPEN
C4
START PROGRAM DATA MANAGEMENT SECTION
C5
SET START ADDRESS OF PROGRAM DATA
C6
EXECUTION
C7
C8
REQUEST FLAG ?
YES
NO
C9
SET F/F (TABLE DATA REQUEST)
C10
SET DATA IN DATA REGISTER
C11
GATE OPEN
C12
START TABLE DATA MANAGEMENT SECTION
C13
RESET F/F

COMPUTER FOR FORMING A TABLE BY SELECTING A PROGRAM LANGUAGE MODE DURING A TABLE MODE

BACKGROUND OF THE INVENTION

The present invention relates to a computer for forming a table by selecting a program language mode during a table mode.

Along with widespread development of personal computers, a computer is commercially available which can form a table (i.e., spreadsheet) by entering table format data, e.g., data for the number or records, the number of items and number of digit positions, and table data, e.g., items to be written in the table whose format is defined by the table format data, which are required for forming the table by the computer.

"VisiCalc", "multiplan" and "Super Calc", which are respectively available from Viscorp, Microsoft and SORCIM, are well-known spreadsheet programs.

Various drawbacks are presented in the application of these programs. First, when a table, shown in FIG. 1, is to be formed, subtotal data for each column or row can be easily calculated. However, more complex calculations than the above-mentioned calculation cannot be performed. Second, when calculations are performed for any columns or rows in a single table in accordance with different calculation formulas and the resultant data are located in different blocks, it is difficult to determine which calculation formula was used to derive the resultant data located in a predetermined block. For example, in the table shown in FIG. 1, when the calculation formula is given as $$RC3=RC1+RC2[IT4] \quad (1)$$

a sum of data written in a block "b", given by RC1 (RECORD1) and IT4 (ITEM4), and data written in a block "c", given by RC2 and IT4, is written in a block "a", given by RC3 and IT4. In this manner, when one calculation formula is used in formation of a single table, calculations are simple. However, assume that a plurality of calculation formulas are used to form a single table, as follows:

$$RC3=RC1+RC2[IT2-IT4] \quad (2)$$

$$IT4=IT2+IT3[RC1-RC2] \quad (3)$$

$$IT4=IT2+IT3[RC2-RC3] \quad (4)$$

it is difficult to check which calculation formula was used to derive data written in a predetermined block.

Third, when a plurality of tables are formed, the respective tables are independently formed. Even if the first and second tables are formed in accordance with the same calculation formulas, the calculation formulas must be established for each individual table. It is impossible to shift data written in a block in the first table to a block in the second table or to form a third table by using data written in the first and second tables. A calculation program (hereafter referred to as a calc program) is proposed to solve the first problem and to perform complex calculations and constitutes a subroutine part of the main program. However, the subroutine is regarded as a jump in the same program, so the number of functions of the table or spreadsheet program is increased, thereby complicating the application of the program. On the other hand, since a program language such as FORTRAN or BASIC is used in general-purpose computers, complex calculations can be performed. However, in practice, a floppy disk of a program language is set in a floppy disk drive to load the program language into the computer so as to perform complex calculations. In the table mode, a floppy disk of a table program must be set in the floppy disk drive to load the table program in place of the program language. As a result, the program language cannot be loaded in the table mode.

On the other hand, it is known that different program languages can be simultaneously used in accordance with time sharing or multiprograming. However, these programs are independently executed. In other words, these programs neither have any correlation therebetween nor are subjected to selection as to when they are needed. Therefore, even if time sharing or multiprograming is used, the program language cannot be used to perform complex calculations for the blocks of the table in the table mode.

SUMMARY OF THE INVENTION

The present invention has been made in consideration of the above situation and has as its object to provide a computer capable of selecting a program language mode during a table mode and writing in table data derived from a program language calc program.

In order to achieve the above object of the present invention, there is provided a computer for forming a table by selecting a program language mode during a table mode, which comprises mode switching means for selecting one of the table mode and the program language mode;

key input means for entering table format data and table data in the table mode and a program language of a program in the program language mode;

table managing means connected to said mode switching means, for performing table formation procedures in accordance with instruction codes that represent a prestored table formation process, and for obtaining resultant table data when said mode switching means is set in the table mode and the table format data and the table data are entered upon operation of said key input means;

program memory means for storing program data when said mode switching means is set in the program language mode and the program data of the program language is entered upon operation of said key input means;

program language-managing means connected to said mode switching means and said program memory means, for managing program execution for data stored in said program memory means in accordance with instruction codes which represent an execution program of a prestored program when said mode switching means is set in the program language mode;

instruction decoder means connected to said table managing means and said program language-managing means, for decoding the instruction codes corresponding to the table formation procedures executed by said table managing means and program language request codes which correspond to the program data stored in said program memory means;

bus line means connected to said table managing means and said instruction decoder means, for transferring data required for the table formation procedures;

memory means connected to said key input means through said bus line means and said mode switching means, for storing the table format data and character data which are entered in the table mode;

program language-requesting means connected to said instruction decoder means, for generating a start signal for starting said program language-managing means when a result decoded by said instruction decoder means in the table mode is detected to be the program language-request codes;

program designating means connected to said bus line means, for designating the program stored in said program memory means when the start signal is generated from said program language-requesting means;

memory area-designating means connected to said program language-managing means, for designating a predetermined memory area of said memory means so as to store in said predetermined memory area resultant data, obtained by said program language-managing means on the basis of the program designated by said program designating means;

means operating to store the resultant data in said predetermined area of said memory means which is designated by said memory area designating means; and output means connected to said table managing means and said program language-managing means through said mode switching means, for generating a table formation result.

In the computer having the configuration described above, wherein the program language mode can be selected during the table mode to form a table, the program written by the program language is accessed in the table mode to perform complex calculations beyond the four basic arithmetic operations, so that the resultant data can be used as the table data. In addition, when the sum of the data in the first and second tables can be written in the third table, the third table can be easily formed by using a program of the program language, resulting in convenience.

BRIEF DESCRIPTION OF THE DRAWINGS

FIG. 2 is a block diagram of a computer according to an embodiment of the present invention;

FIG. 3 shows a functional block diagram of a system control section 1 shown in FIG. 2;

FIG. 6B is a block diagram showing the detailed arrangement of an instruction decoding section 34 shown in FIG. 5;

FIG. 9 is a block diagram showing the detailed arrangement of a table data-request receiving section 16 shown in FIG. 4;

FIG. 10 is a block diagram showing the detailed arrangment of a program language-request receiving section 36 shown in FIG. 5;

FIG. 11 is a flow chart for schematically explaining the operation of the circuit shown in FIG. 2;

FIGS. 12(A) to 12(F) respectively show typical examples of different tables;

FIGS. 13(A) to 13(D) respectively show further typical examples of different tables;

DETAILED DESCRIPTION OF THE PREFERRED EMBODIMENT

Figure 1:
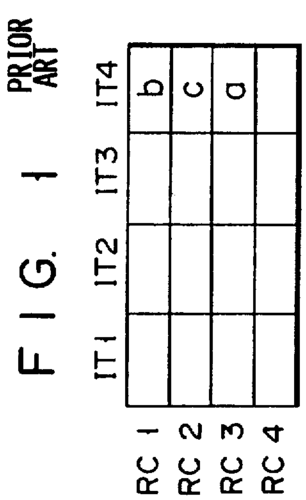
FIG. 1 shows a typical table format.

FIG. 2 is a block diagram showing the overall configuration of a computer according to an embodiment of the present invention. A system control section 1 is connected to a key input unit 2, a display unit 3 and an external memory 4. The system control section 1 performs key input control, display control, mode switching control, and operation control of external devices, as seen from FIG. 3. In addition, the system control section 1 is connected to a table data-control section 5, a program data-control section 6, and RAMs 7 and 8 through a bus line B1 including a data bus, an address bus, and a control bus.

The RAM 7 is connected to the table data-control section 5 through a bus line B2, and the RAM 8 is connected to the program data-control section 6 through a bus line B3. These RAMs 7 and 8 may be formed on different memory chips or on the same memory chip. In the latter case, they occupy different address areas of the memory chip. The table data-control sections 5 and 6 are connected by a bus line B4.

Figure 4:
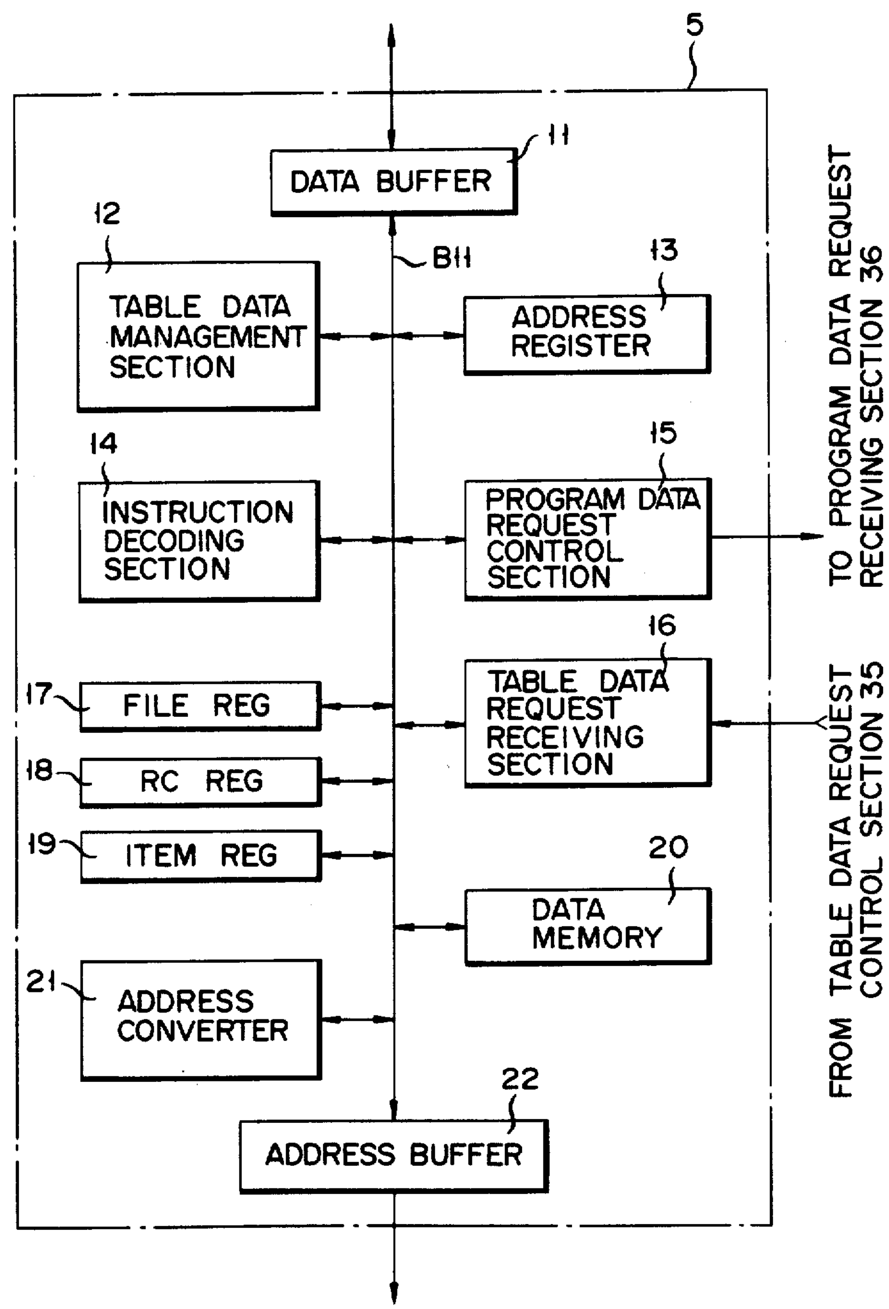
FIG. 4 is a block diagram showing the detailed arrangement of a table data-control section 5 shown in FIG. 2.

The detailed arrangement of the table data-control section 5 will now be described with reference to FIG. 4;

Referring to FIG. 4, a data buffer 11 exchanges data with the system control section 1 through the bus line B1. The data buffer 11 is connected through a bus line B11 to a table data-management section 12, an address register 13 in which address data for the table data-management section 12 is set, an instruction decoding section 14, a program data-request control section 15 for generating and sending a request for program data processing to the program data-control section 6 shown in FIG. 2, a table data-request receiving section 16 for receiving the table data request from the program data-control section 6, a file register (FILE REG) 17 for storing file names, a record register (RC REG) 18 for storing record number data, an item register (ITEM REG) 19 for storing item number data, a data memory 20, an address converter 21 for performing address conversion in accordance with the data set in the registers 17 to 19, and an address buffer 22 for storing address data from the address converter 21. The address of the RAM 7 is accessed in response to data held in the address buffer 22. The table data-management section 12 stores instruction codes to execute table formation only by means of table format data and table data entry without loading a program.

Figure 5:
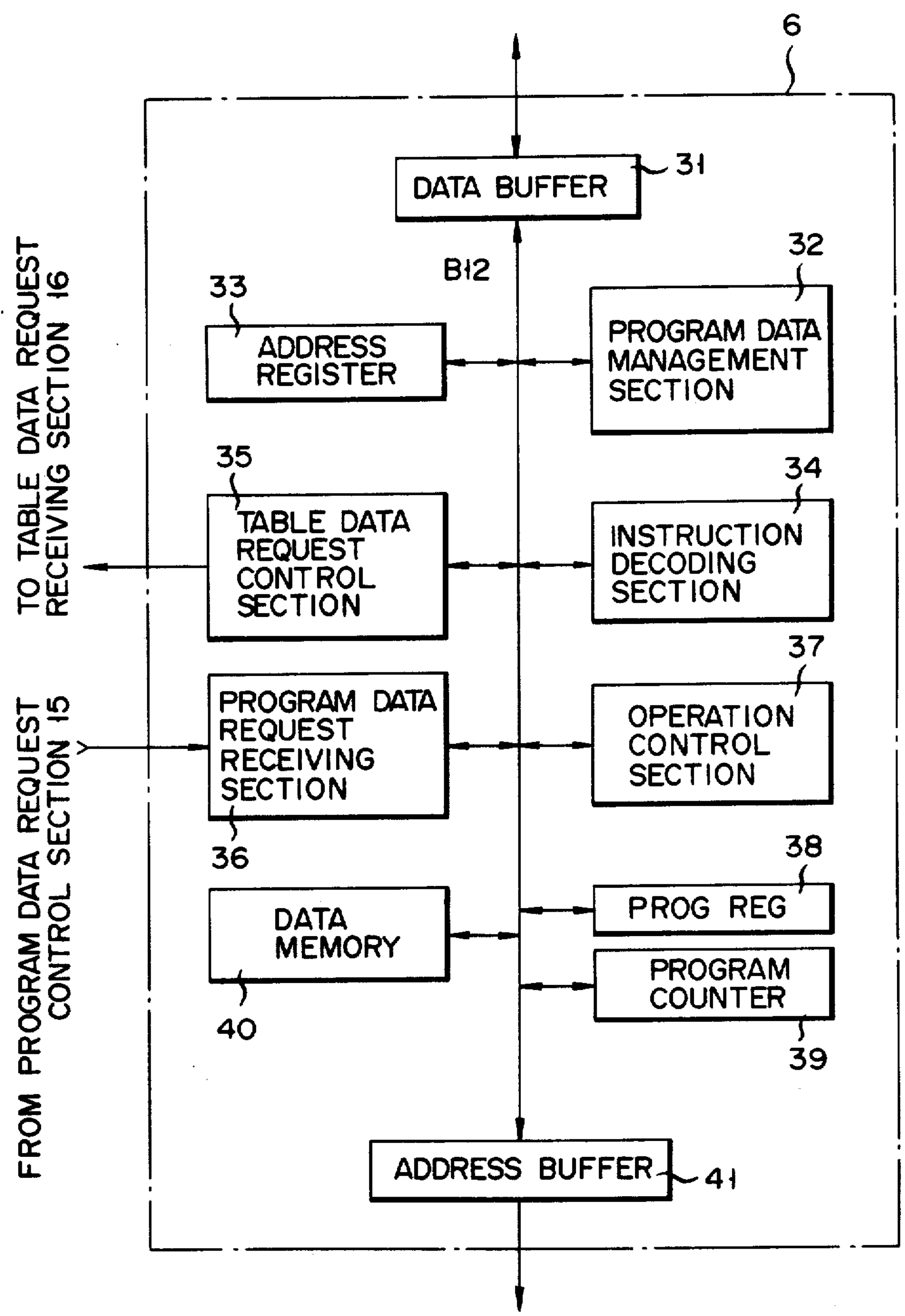
FIG. 5 is a block diagram showing the detailed arrangement of a program data-control section 6 shown in FIG. 2.

FIG. 5 shows the detailed arrangement of the program data-control sectiôn 6 shown in FIG. 2. A data buffer 31 exchanges data with the system control section 1 through the bus line B1. The data buffer 31 is connected through a bus line B12 to a program data-management section 32, an address register 33 for storing address data for the program data-management section 32, an instruction decoding section 34, a table data-request control section 35 for generating and sending a table data request to the table data-control section 5, a program data-request receiving section 36 for receiving the program data-processing request from the table data-control section 5, an operation control section 37, a program register (PROG REG) 38 for designating program number data, a program counter (PC) 39 for designating line number data, and an address buffer 41 for storing address data to be supplied to the RAM 8. The program data management section 32 stores instruction codes for executing a program of a program language.

The program data-request control section 15 and the program data-request receiving section 36 are connected by the bus line B4. The table data-request control section 35 and the table data-request receiving section 16 are connected also by the bus line B4. Instead, the bus line B1 may be used to connect these sections.

Figure 6A:
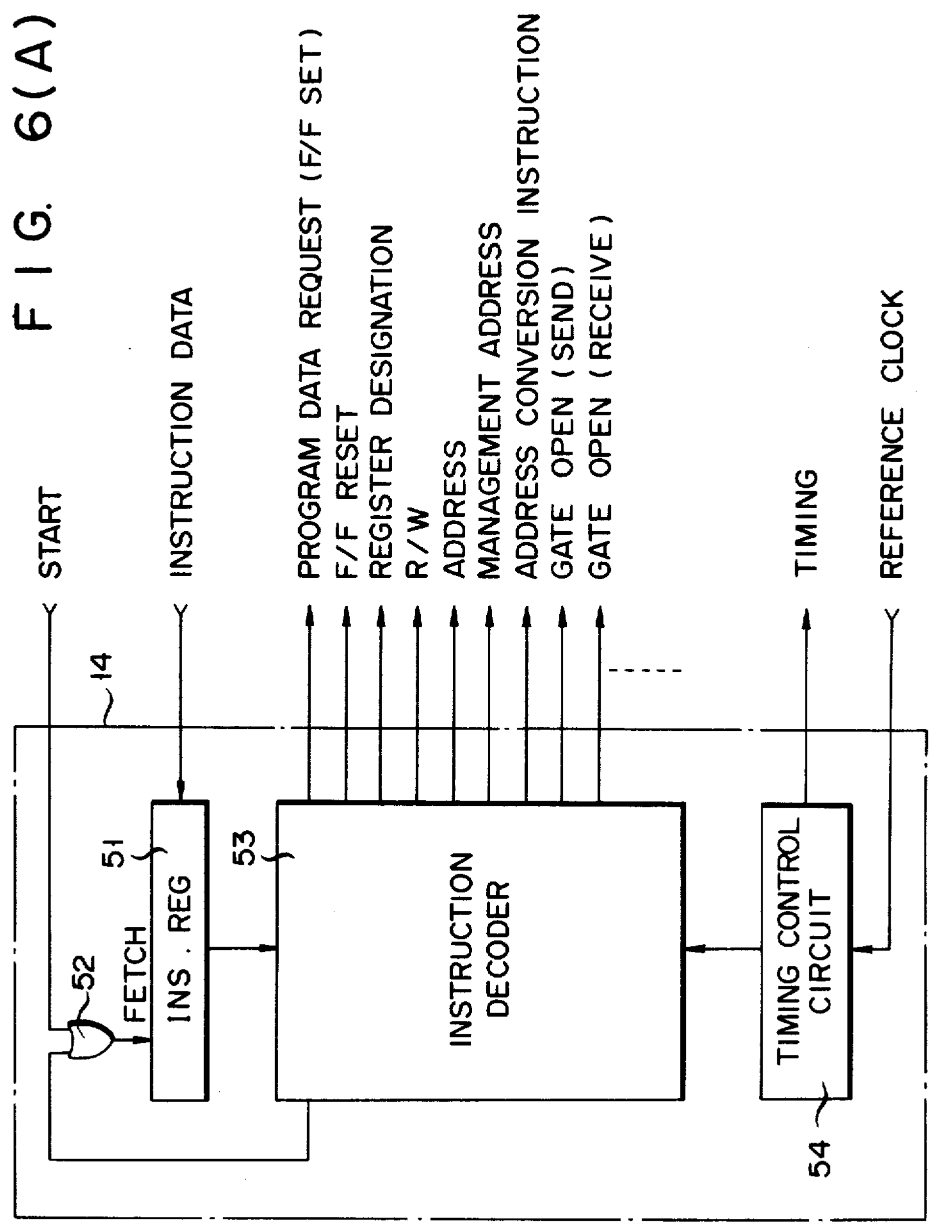
FIG. 6A is a block diagram showing the detailed arrangement of an instruction decoding section 14 shown in FIG. 4.

FIG. 6A shows the detailed arrangement of the instruction decoding section 14 shown in FIG. 4. An instruction register 51 receives instruction code data in synchronism with a start instruction supplied through an OR gate 52. The instruction code data is supplied from the system control section 1 through the data buffer 31 or from the table data management section 12. The data from the instruction register 51 is supplied to an instruction decoder 53. The instruction decoder 53 decodes the instruction codes and generates instructions such as a program data-processing request signal, a program data-request cancel signal (F/F reset), a register designation signal, a read/write signal R/W, an address signal ADR, a management section address signal, an address conversion signal, a gate open signal (send), a gate open signal (receive), and so on. The instruction decoder 53 is operated in response to a timing signal generated from a timing control circuit 54. The timing control circuit 54 counts reference clocks and generates a timing signal to the instruction decoder 53 and other timing signals to other internal circuits. The instruction decoder 53 performs decoding in response to the timing signal from the timing control circuit 54 and supplies a read signal for the next instruction to the instruction register 51 through the OR gate 52 at an end of the current instruction decoding.

FIG. 6B shows the instruction decoding section 34 (FIG. 5) in greater detail. The section 34 has the same structure as the instruction decoding section 14. It includes, as shown in FIG. 6B, an OR gate 341, an instruction register 342, an instruction decoder 343 and a timing control circuit 344.

Figure 7:
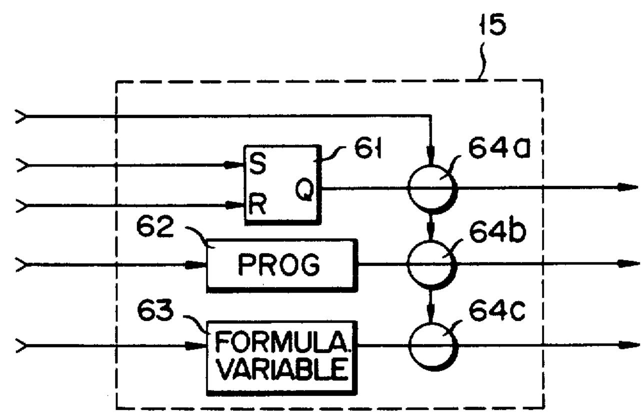
FIG. 7 is a block diagram showing the detailed arrangement of a program language-request control section 15 shown in FIG. 4.

FIG. 7 shows the detailed arrangement of the program data-request control section 15. The section 15 comprises a request flip-flop 61 which is set/reset in response to the signal from the instruction decoder 53, a program number register 62 for storing a designated program number, and a formula/variable register 63 for storing formula and variable data. An output from the flip-flop 61 and data held by the registers 62 and 63 are supplied to the program data-request receiving section 36 in the program data-control section 6 through gate circuits *64a* to *64c*. The gate circuits *64a* to *64c* are controlled in response to the gate open signal (send) from the instruction decoder 53.

Figure 8:
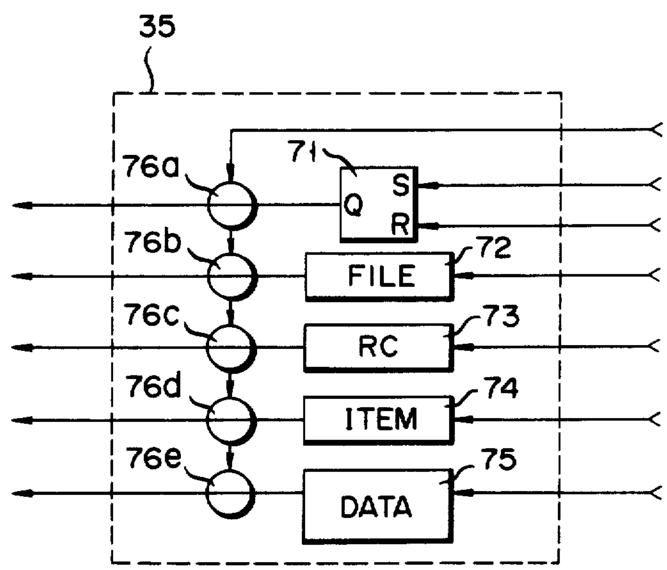
FIG. 8 is a block diagram showing the detailed arrangement of a table data-request control section 35 shown in FIG. 5.

FIG. 8 shows the detailed arrangement of the table data-request control section 35. The section 35 comprises a request flip-flop 71, a file register (FILE) 72 for storing a file name, a record register (RC) 73 for storing record number data, an item register (ITEM) 74 for storing item number data, and a data register (DATA) 75 for storing the operation result. An output from the request flip-flop 71 and data held by the registers 72 to 75 are supplied to the table data request receiving section 16 in the table data-control section 5 through gate circuits *76a* to *76e*. The gate circuits *76a* to *76e* are controlled in response to the gate open signal generated from the instruction decoding section 34.

FIG. 9 shows the detailed arrangement of the table data-request receiving section 16. The section 16 has registers 81 to 84 respectively corresponding to the registers 72 to 75 in the section 35 shown in FIG. 8. The registers 81 to 84 receive data from the section 35 through gate circuits *85a* to *85d*, respectively. In the table data request receiving section 16, the start request signal from the flip-flop 71 is directly supplied to the table data-management section 12. When the table data-management section 12 receives a start request signal, it generates a start signal to open the gate circuits *85a* to *85d* through the instruction decoder section 14 and receives data from the table data-request control section 35.

FIG. 10 shows the detailed arrangement of the program data-request receiving section 36. The section 36 has registers 91 and 92 corresponding to the registers 62 and 63 in section 15, respectively. The program data-request receiving section 36 receives data from the program data request control section 15 through gate circuits *93a* and *93b*. In the program data-request receiving section 36, the start request signal from the request flip-flop 61 in section 15 is directly supplied to the program data management section 32 without being gated through a gate. When the program data management section 32 receives the start request signal, it generates a start signal to open the gate circuits *93a* and *93b* through the instruction decoding section 34 and receives data from the program data request control section 15.

The operation of the computer according to this embodiment will now be described. The overall operation of the computer shown in FIG. 2 will be described with reference to the flow chart of FIG. 11. The system control section 1 checks in step A1 whether the computer is set in the table mode using the table data or in the program data mode using a program language. A mode is set by switching a slide switch on the key input unit 2. When the tables shown in FIGS. 12(A) to 12(C), for example, are formed from the table data and the system control section 1 is set in the table mode, the data is fetched in step A2 and the flow advances to step A3. The system control section 1 checks in step A3 whether or not program data (program language) processing is required (i.e., if the program data processing request is generated). If NO in step A3, the flow advances to step A4 wherein the instruction fetched in step A2 is executed. In addition, in step A4, when the table data-control section 5 receives the table data-processing request, generated from the program data-control section 6, the instruction corresponding to the request is performed. The system control section 1 then checks in step A5 whether or not this instruction execution is based on the request from the program data-control section 6 (i.e., if the flow must return to the program data processing mode). If NO in step A5, the flow advances to step A6. The system control section 1 checks in step A6 whether or not the routine is to be ended. If NO in step A6, the flow returns to step A2, and the same operation as described above is repeated to form the tables shown in FIGS. 12(A) to 12(C). The resultant table data are stored in the RAM 7.

On the other hand, when the program data-processing mode is set so as to define the program language or perform operations, the mode status is checked in step A1. The instruction is fetched in step A7, and the flow advances to step A8. The system control section 1 checks in step A8 whether or not the table data-processing request is generated. If NO in step A8, the flow advances to step A9. The instruction fetched in step A7 is executed in step A9. In addition, in step A9, when the program data-control section 6 receives the program data-processing request generated from the table data-control section 5, the instruction corresponding to this request is executed. The flow advances to step A10. The system control section 1 checks in step A10 whether or not this instruction execution is based on the request generated from the table data-control section 5 (i.e., if the flow must return to the table data processing mode). If NO in step A10, the system control section 1 advances to step A11 where it checks whether or not the routine is to be ended. If NO in step A11, the flow returns to step A7, and the same operation as described above is repeated. However, if YES in step A10, the flow returns to step A6 in the table data-processing flow. When the return instruction is detected in step A5, the flow returns to step A11 in the program data-processing flow.

The input operation of the files to be registered will now be described with reference to the above-mentioned flow chart.

File 1 shown in FIG. 12(A) is a typical example of a table under the file name "TV". It shows the number of TV sets Tom has sold in January and February and the number of TV sets that Bill has sold in January and February. The data entry is performed as shown in Tables I and II, wherein the data shown on the left of ":" is requested by computer, and the data shown on the right of ":" has been input by operating the key 2 input unit. The data entry is performed as follows:

TABLE I

| File Name: TV | | |
|---|---|---|
| Number of Rec. | | : 3 |
| Number of Item | | : 4 |
| | Label Record | |
| | Item 1: NAME | |
| Type(N/S) | | : S |
| Expression | | ? |
| Format | | : & & |
| | Item 2: JAN. | |
| Type(N/S) | | : N |
| Expression | | ? |
| Format | | : #### |
| | Item 3: FEB. | |
| Type(N/S) | | : N |
| Expression | | ? |
| Format | | : #### |
| | Item 4: TOTAL | |
| Type(N/S) | | : N |
| Expression | | SUMIT(2,3) |
| Format | | : ##### |
| | Data Area | |
| 1-1 | | :TOM |
| 1-2 | | :100 |
| 1-3 | | :200 |
| 1-4 | | ? |
| 2-1 | | :BILL |

TABLE I-continued

| File Name: TV | |
|---|---|
| 2-2 | :50 |
| 2-3 | :60 |
| 2-4 | ? |
| 3-1 | :TOTAL |
| 3-2 | :SUMRC(1,2) |
| 3-3 | :SUMRC(1,2) |
| 3-4 | :SUMIT(2,3) |

File 2, in FIG. 12(B), is another typical example of a table under the file name "RADIO". The data entry is performed as follows:

TABLE II

| File Name: RADIO | | |
|---|---|---|
| Number of Rec. | | : 3 |
| Number of Item | | : 4 |
| | Label Record | |
| | Item 1: NAME | |
| Type(N/S) | | : S |
| Expression | | ? |
| Format | | : & & |
| | Item 2: JAN. | |
| Type(N/S) | | : N |
| Expression | | ? |
| Format | | : #### |
| | Item 3: FEB. | |
| Type(N/S) | | : N |
| Expression | | ? |
| Format | | : #### |
| | Item 4: TOTAL | |
| Type(N/S) | | : N |
| Expression | | ? |
| Format | | : ##### |
| | Data Area | |
| 1-1 | | :TOM |
| 1-2 | | :500 |
| 1-3 | | :600 |
| 1-4 | | :PROG1;A |
| 2-1 | | :BILL |
| 2-2 | | :120 |
| 2-3 | | :110 |
| 2-4 | | :PROG1;A |
| 3-1 | | :TOTAL |
| 3-2 | | :PROG1;B |
| 3-3 | | :PROG1;B |
| 3-4 | | :PROG1;A |

Program 1, to be linked in Item 4: TOTAL of File 2, is exemplified as follows:

TABLE III

| PROG 1 | |
|---|---|
| Line No. | 10 A=IT(2)+IT(3) |
| | 20 B=RC(1)+RC(2) |
| | 30 END |

File 3, in FIG. 12(C), shows still another table under the file name "TOTAL". The data entry is performed as follows:

TABLE IV

| File Name: TOTAL | | |
|---|---|---|
| Number of Rec. | | : 3 |
| Number of Item | | : 4 |
| | Label Record | |
| | Item 1: NAME | |
| Type(N/S) | | : S |
| Expression | | ? |
| Format | | :& & |
| | Item 2: JAN. | |
| Type(N/S) | | : N |
| Expression | | ? |

TABLE IV-continued

| File Name: TOTAL | |
|---|---|
| Format | : #### |
| Item 3: FEB. | |
| Type(N/S) | : N |
| Expression | ? |
| Format | : #### |
| Item 4: TOTAL | |
| Type(N/S) | : N |
| Expression | : SUMIT(2,3) |
| Format | : ##### |
| Data Area | |
| 1-1 | TOM |
| 1-2 | :PROG2;C |
| 1-3 | ? |
| 1-4 | ? |
| 2-1 | :BILL |
| 2-2 | :PROG2;D |
| 2-3 | ? |
| 2-4 | ? |
| 3-1 | :TOTAL |
| 3-2 | :SUMRC(1,2) |
| 3-3 | :SUMRC(1,2) |
| 3-4 | ? |

Program 2, to be linked in File 3, is given as follows:

TABLE V

| PROG 2 | |
|---|---|
| LINE NO. | 10 C=FL(1,1,2)+FL(2,1,2) |
| | 20 D=FL(1,2,2)+FL(2,2,2) |
| | 30 FL(3,1,3)=FL(1,1,3)+FL(2,1,3) |
| | 40 FL(3,2,3)=FL(1,2,3)+FL(2,2,3) |
| | 50 END |

It will now be described how to read files 1, 2 and 3.

File 1 is entitled "TV." As shown in Table I, the number of records is "3" and the number of items is "4". The number of records is "3", not "4", because record 0 is a label record for defining each item. The number of TV sets that Tom sold in January, i.e., "100", the nuber of TV sets that Tom sold in February, i.e., "200", the number of TV sets Bill sold in January, i.e., "50" and the number of TV sets Bill sold in February, i.e., "60" have been recorded in File 1. It will be calculated how many TV sets Tom sold in January and February, how many TV sets Bill sold in these two months, how many TV sets Tom and Bill sold in January, and how many TV sets they sold in February. In item 4, expression SUMIT (2, 3) shown in Table I (i.e., addition of items 2 and 3) is defined. In items 2 and 3 of record 3, expression SUM RC (1, 2) (i.e., addition of records 1 and 2) is defined.

File 2 is entitled "RADIO". "PROG 1;A" in item 4 of record 1 and in item 4 of record 2 indicates that the value for variable A of program No. 1 stored in the RAM 8 has been written in program language. "PROG 1; B" in item 2 of record 3 indicates that the value for variable B of pogram No. 1 has been written in the program language. "PROG. 2; B" in item 3 of record 3 means that the value for variable B of program No. 2 stored in the RAM 8 has been written in the program language. As shown in Table III, the statement of line No. 10 means that the sum of items 2 and 3 is the value for variable A and the statement of line No. 20 means that the sum of records 1 and 2 is the value for variable B. Hence, the calculations similar to those defined in file 1 will be carried out also in file 2.

File 3 is entitled "TOTAL". Three items of this file are left blank. These items will be defined by program 2 shown in Table V. The statement of line 10 of program 2 means that the sum of item 2 of record 1 of file 1 and item 2 of record 1 of file 2 is the value for variable C and that the value for C should be written as item 2 of record 1 of file 3. Similarly, the statement of line 20 means that the sum of item 2 of record 2 of file 1 and item 2 of record 2 of file 2 is the value for variable D. The statement of line 30 means that item 3 of record 1 of file 1 should be added to item 3 of record 1 of file 2 and the resultant sum should be written as item 3 of record 1 of file 3. Accordingly, when program No. 2 is executed, the items in one row of file 1 are added to those in the corresponding row of file 2 and the items in one column of file 1 are added to those in the corresponding column of file 2, and the sums of the items of files 1 and 2 are written in file 3.

Figure 14:
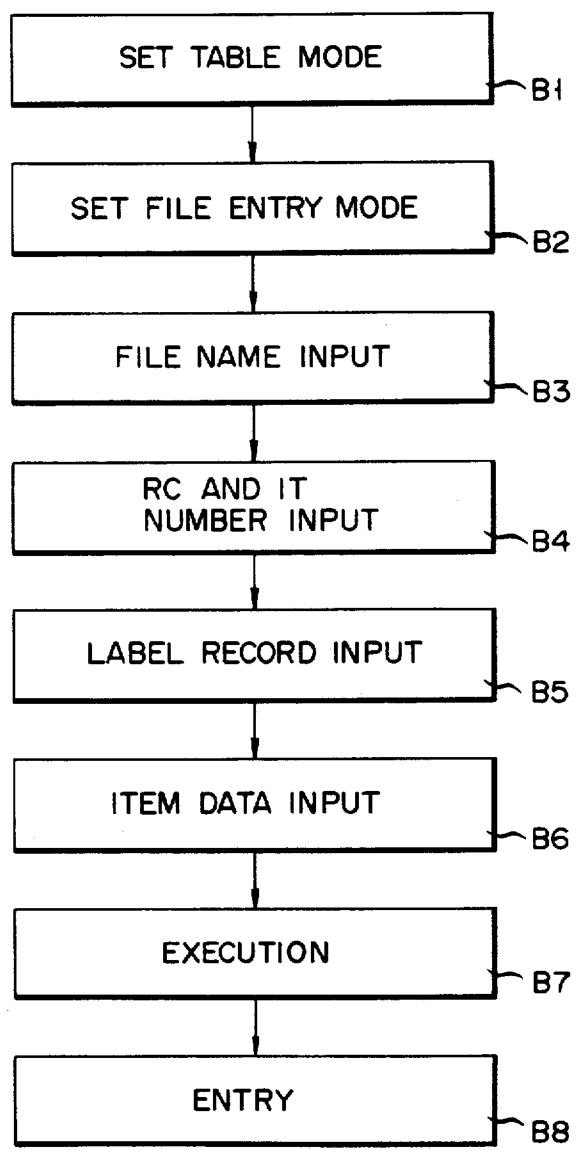
FIG. 14 is a flow chart for explaining the table formation procedures.

An operation of forming a file shown in FIG. 12(A), according to the TABLES I to V will now be described with reference to the flow chart of FIG. 14. The mode switch in the key input unit 2 is set in the table mode in step B1. The file entry mode is set in step B2. The file mode specifies the table data-control section 5. The file entry control is then performed in the table mode. In step B3, a file name is entered at the key input unit 2. For example, in order to register a file name concerning TV system components, the operator types "FILE:TV" at the key input unit 2. The operator then types numerals corresponding to the number of records (RC) and the number of items (IT). In the case shown in FIG. 12(A), four records and four items are required, so that the operator enters "RC:3" and "IT:4" in step B4. The operator then enters a label code in step B5. The label code defines the contents of the respective items. Item 1 is labeled "NAME", and symbols (S) may be written in this item but no expression can be written therein. At most five symbols can be written in item 2 (&—&). Item 2 is labeled "JAN.", and a number (N) may be written in this item but no expression can be written therein. At most four four digits (####) can be written in item 2. Item 3 is labeled "FEB.", and a number (N) may be written in it but no expressioin can be written therein. At most four digits (####) can be written in item 3. Item 4 is labeled "TOTAL", and the sum of items 2 and 3, which is obtained as represented by expression SUM IT (2, 3), is written in this item.

After the operator enters the label record in step B5, the operator enters item data in step B6. As shown in FIG. 12(A), for record 1 (RC1), the operator enters "TOM" as the article in IT1, "100" as the number of said products in IT2, and "200" as the "number of sold products" in IT3. The operator enters item data for records 2 and 3 (RC2 and RC3) in the same manner as for RC1. Mark "?" in item 4 of record 1 and item 4 of record 2 indicates that the sum of items 2 and 3, which is found by simple addition, is not written in these items. In step B7, the input data are calculated in accordance with the program data, and thereafter, in step B8, the resultant data are stored in the RAM 7.

Figure 15:
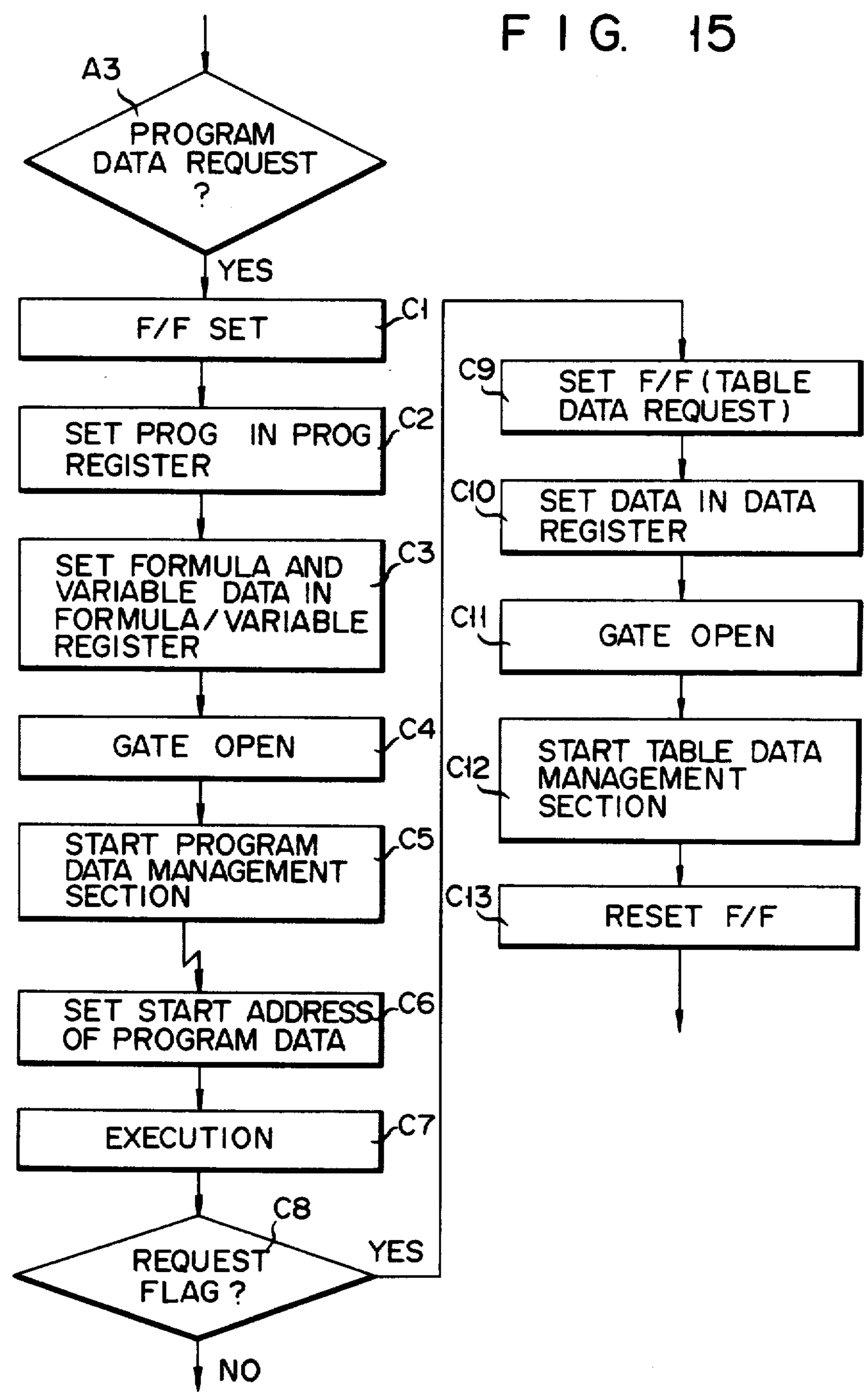
FIG. 15 is a flow chart for explaining the program language processing.

An operation will now be described wherein a program data request is generated in the table mode. When the file entry for the table in FIG. 12(A) is performed, operation using the program data must be performed for data in item 4. In this case, in step A3 of the flow in FIG. 11, the program data-request signal is generated from the instruction decoder 53 in FIG. 6 and is supplied to the program data-request control section 15 shown in FIG. 7. The flip-flop 61 in the program data-request control section 15 is set in response to this request signal in step C1 of the flow in FIG. 16. In step C2, the table data control section 5 sets a program NO in the program number register 62 of FIG. 7. The formula and variable data are set in the register 63 in step C3. When the file entry is performed to form the table shown in FIG. 12(A), the program written in the program language need not be loaded and the total amount can be obtained by specifying the formula "SUMIT(2,3)". In step C3, the formula "SUMIT(2,3)" (i.e., "100+200" for RC1) is set in the register 63. In step C4, the gate open signal is supplied from the instruction decoder 53 to the program data-request control section 15 to open the gate circuits 64*a* to 64*c* of FIG. 7, so as to supply the contents of the flip-flop 61 and the registers 62 and 63 to the program data-request receiving section 36 shown in FIG. 10. The program data request receiving section 36 unconditionally receives the start request signal from the flip-flop 61. The program data-management section 32 is started, as shown in step C5. The program data-management section 32 performs control operations. In particular, the section 32 supplies the gate open signal to the program data-request receiving section 36, so that the gate circuits 93*a* and 93*b* are opened to allow the registers 91 and 92 to store data which are supplied from the registers 62 and 63 in the program data-request control section 15. The program data-management section 32 sets the start address signal in step C6 for the RAM 8 in the registers 91 and 92. The operation in response to the request from the table data-control section 5 is performed in step C7. In this case, data for the formula "SUMIT(2,3)" (i.e., "100+200" for RC1) is supplied from the table data-control section 5, and the program data-management section 32 performs the operation corresponding to this formula. The system control section 1 checks in step C8 whether or not the request signal is supplied from the program data-request control section 15. If NO in step C8, the flow advances to step A11 of the flow shown in FIG. 11. However, if YES in C8, the flow advances to step C9 shown in FIG. 15. The flip-flop 71 in the table data request control section 35 is set in step C9, so that the table data request signal is generated. In step C10, the calculation result obtained in step C7 is set in the data register 75. Other registers 72 to 74 are used only when table data processing is required by the program data-control section 6. In the case described above, these registers are not used. Thereafter, the gate circuits 76*a* to 76*e* are opened in step C11, and the output from the flip-flop 71 and the data held by the registers 72 to 75 are supplied to the table data-request receiving section 16 shown in FIG. 9. The table data-request receiving section 16 unconditionally receives the request signal from the flip-flop 71 and starts the table data-management section 12. The table data-management section 12 starts the control operation which opens the gates 85*a* to 85*d* in the table data-request receiving section 16, so that data from the registers 72 to 75 in the table data-request control section 35 are set in the registers 81 to 84. Thereafter, the flip-flop 61 in the program data-request control section 15 is reset in step C13, and the program mode is switched to the table mode. The program data management section 32 sets the flip-flop 71 in the table data-request control section 35. The table data-management section 12 writes, in item 4 of the file of FIG. 12(A), the resultant data which is obtained by program data processing. The operation using program data is performed every time data entry of each record is performed. By repeating the above operation, the file in FIG. 12(A) is obtained.

Similar processes are conducted also on the expession, SUM RC (1,2) written in items 2 and 3 of record 3.

Now, it will be explained how to prepare file 2 shown in FIG. 12(B). The format of file 2 is identical with that of file 1 shown in FIG. 12(A), and pieces of data are entered in the same order. To enter data for item 4, a program data-request is made. Then, program No. 1 is transferred from the program register 62 to the program register 91 and variable A is transferred from the variable register 63 to the variable resister 92. Program No. 1 is executed, thus providing data. This data is transferred from the data register 75 to the register 84. A sequence of similar operations will be carried out for any other item.

It will be described how to prepare file 3 shown in FIG. 12(C). First, a request is made to the table data-control section 5 from the program data-control section 6. When program No. 5 (Table V) is executed, the data of file 2 will be added to the data of file 1 and the sum will be written in file 3, as indicated by the statement of line 30. In this case, the instruction decoding section 34 supplies a table data request signal to the table data-request control section 35. As a result, the flip-flop 71 of the section 35 is set. Further, the file number, record number and item number are input to the registers 72, 73 and 74, respectively. In response to a gate-opening instruction from the instruction decoding section 34, these registers 72, 73 and 74 transfer their respective contents to the registers 81, 82 and 83 of the table data-request receiving section 16. The pieces of data from the registers 82, 83 and 84 are transferred to the address converter 21 through the bus line B11. They are converted into the addresses of the RAM 7, whereby data is written into, or read from, the RAM 7. In order to write data into the RAM 7, the data is input through the registers 75 and 84. In order to read data from the RAM 7, the data is input through the registers 63 and 92.

By conducting all the operations described above, files 1-3 shown in FIGS. 12(D), 12(E) and 12(F) are completed and stored in the RAM 7. These files may be displayed by the display 3 whenever required.

Another embodiment of the present invention may now be described with reference to FIGS. 13(A-)-13(D). The operation of this embodiment is similar to that of the first embodiment and will not therefore be explained in detail. FIG. 13(B) shows a case where a file of trigonometric function is entered. When the label record is written for record 0, "RC" is written for item 1 to specify the record number, the formula "SIN(RC*45)" is written for item 2, and program no. "PROG#0" and variable "A" are written for item 3. This variable "A" is a value specified by RC. Item data "RC", written for item 1 (IT1), is given to be "1" for RC1, "2" for RC2, and "3" for RC3. When data is written in a position given by record 1 and item 2, data for the formula "SIN(RC*45)" is supplied from the table data-control section 5 to the program data-control section 6. For example, if "RC=1" is given for record 1, the above formula "SIN(RC*45)" is given to be SIN(1*45). Therefore, the program data-control section 6 performs the operation "SIN45°=0.70711". The operation result is supplied to the table data-control section 5 and is written in a position given by record 1 and item 2. When data is to be written in a position given by record 1 and item 3, the content "PROG#0;A" of the label is supplied to the program data-control section 6. When the program number is specified by the table data-control section 5, the program data-control section 6 reads out the corresponding program and runs it. For example, when "PROG#0" is given for the program as follows:

10 A=COS(RC*45)

20 END calculation is performed for RC=1 such that "COS45°=0.70711". This operation result is supplied to the table data-control section 5 and is written in the position given by record 1 and item 3. In the same manner as described above, arithmetic operations for RC2 and RC3 are performed by the program data-control section 6. The operation results are written in the corresponding positions, thereby preparing the file shown in FIG. 13(B).

An operation will now be described with reference to FIG. 13(C) wherein the program data-control section 6 specifies the table data-control section 5 during execution of PROG#1. The operation result is written in a position given by record 1 and item 3 of file #2. In line number 10 of PROG#1, this program causes the table data-control section 5 to specify file #1 and read out data "0.70711" from the position given by record 1 and item 2. The readout data value is defined as "B". In line number 20, the formula "C=SIN(B)*COS(B)" is defined, and "C=0.01234" is calculated in accordance with this formula. In addition, in line number 30, the request signal is supplied to the table data-control section 5 to specify file #2, and data "C=0.01234" is written in the position given by record 1 and item 3. In the same manner as described above, predetermined data are written in file #2 by means of the program data-control section 6.

FIG. 13(D) shows a case wherein a file has an instruction sequence as item data. In this file, when the calculation formula is included in steps for executing an instruction, the request signal is supplied to the program data-control section 6 to perform the predetermined operation.

What is claimed is:

1. A computer capable of switching to a program language mode during a table mode of operation, comprising:

system control means including mode switching means for selecting one of a table mode and a program language mode of operation;

key input means coupled to said system control means for entering table format data and table item data when the table mode is selected, and for entering a program expressed by a program language when the program language mode is selected;

table managing means, coupled to said mode switching means, for establishing a completed table in response to instruction codes, after said mode switching means is set in the table mode and the table format data and the table item data are entered to said system control means by operation of said key input means, and for generating program language request codes;

program memory means for storing data corresponding to said program and said instruction codes when said mode switching means is set in the program language mode and the program language is entered upon operation of said key input means;

program language-managing means, coupled to said mode switching means and said program memory means, for managing program execution according to the data stored in said program memory means;

instruction decoder means, coupled to said table managing means and said program language-managing means, for decoding the instruction codes corresponding to the table establishing operation of said table managing means, and for decoding the program language-request codes from said table managing means wherein said request codes correspond to the program data stored in said program memory means;

bus line means, coupled to said table managing means and said instruction decoder means, for transferring data required for the table establishing operation to both latter means;

memory means, coupled to said key input means through said bus line means and said mode switching means, for storing the table format and item data which are entered in the table mode;

program language-requesting means, coupled to said instruction decoder means, for generating a start signal for starting said program language-managing means when said instruction decoder means decodes the program language-request codes while in said table mode;

program designating means coupled to said bus line means, for designating the program stored in said program memory means when the start signal is generated by said program language requesting means;

memory area-designating means, coupled to said program language-managing means, for designating a predetermined memory area of said memory means so as to store in said predetermined memory area table item data obtained by said program language-managing means on the basis of the program designated by said program designating means;

means operating to store the table item data in said predetermined area of said memory means which is designated by said memory area-designating means; and output means, coupled to said table managing means and said program language-managing means through said mode switching means, for generating a completed table on the basis of said table format and item data.

2. The computer according to claim 1, wherein the said program language-managing means further includes operation control means for performing operations necessary to execute a program in accordance with prestored control data.

3. The computer according to claim 2, wherein said instruction decoder means includes means for decoding codes requesting operation of said operation control means, and said program language-requesting means outputs a start signal for starting said program language-managing means when the results of the decoding performed by said instruction decoder means are said codes requesting operation of said operation control means.

4. The computer according to claim 1, wherein said program language-managing means stores the instruction codes requesting for reading out the table data established by said table managing means and includes table data-requesting means for decoding the instruction codes.

5. The computer according to claim 4, wherein said program language-managing means includes area designating means for designating that area of said memory means which stores the table data, when said table data-requesting means outputs a request signal.

6. The computer according to claim 5, wherein said table managing means includes means for converting area-designating data output from said area designating means into an address, so that said memory means can be accessed by said program language-managing means.

* * * * *